United States Patent [19]

Ridenour

[11] 4,126,929

[45] Nov. 28, 1978

[54] METHOD OF TUBE FITTING ASSEMBLY WITH SHOULDER MEANS

[76] Inventor: Ralph G. Ridenour, 525 Beer Rd., Mansfield, Ohio 44906

[21] Appl. No.: 657,060

[22] Filed: Feb. 11, 1976

Related U.S. Application Data

[63] Continuation-in-part of Ser. No. 554,395, Mar. 3, 1975, Pat. No. 3,977,710, which is a continuation-in-part of Ser. No. 425,561, Dec. 17, 1973, abandoned.

[51] Int. Cl.² .................. B21D 39/00; B23P 11/02
[52] U.S. Cl. .................................... 29/523; 285/382.5
[58] Field of Search ............ 29/523, 157 R; 285/382, 285/382.4, 382.5, 132

[56] References Cited

U.S. PATENT DOCUMENTS

| | | | |
|---|---|---|---|
| 1,802,538 | 4/1931 | Rych | 285/382.5 X |
| 1,941,174 | 12/1933 | Jensen | 285/382.5 X |
| 1,971,117 | 8/1934 | Mossberg | 29/523 |
| 2,006,139 | 6/1935 | Arthur | 285/382.5 X |
| 2,477,676 | 8/1949 | Woodling | 29/523 UX |
| 2,545,930 | 3/1951 | Richardson | 285/382.5 X |
| 2,916,816 | 12/1959 | Black et al. | 29/523 X |
| 2,954,495 | 9/1960 | Zeller | 29/523 X |
| 3,817,562 | 6/1974 | Cook et al. | 285/382.5 X |
| 3,940,168 | 2/1976 | Balon | 285/382 X |

FOREIGN PATENT DOCUMENTS 547,358   8/1942   United Kingdom ............... 285/382.5
688,579   3/1953   United Kingdom ............... 285/382.5

*Primary Examiner*—Charlie T. Moon
*Attorney, Agent, or Firm*—Woodling, Krost, Granger & Rust

[57] ABSTRACT

A tube fitting assembly is disclosed comprising a fitting having a first orifice through a portion of the fitting and a second orifice larger than the first orifice and coaxial with and through a portion of the first orifice. The second orifice extends from an outside surface of the fitting. One of the first and second orifices contains a shoulder defining areas of different cross-sectional areas within that orifice. The shoulder includes a shoulder surface facing axially inwardly relative to the outside surface of the fitting. A tubing having a diameter substantially equal to the first orifice occupies the first and second orifices with a first deformed portion formed from a radially expanded tubing wall engaging the other of the first and second orifices. The tubing has a second deformed portion formed from continued radial expansion of the tubing wall engaging the shoulder surface to seal the tubing to the fitting and preventing axial separation of the tubing from the fitting. The foregoing is merely a resume of one general application, is not a complete discussion of all principles of operation of applications, and is not to be construed as a limitation on the scope of the claimed subject matter.

8 Claims, 12 Drawing Figures

METHOD OF TUBE FITTING ASSEMBLY WITH SHOULDER MEANS

CROSS-REFERENCE TO RELATED APPLICATIONS

This is a continuation-in-part of application Ser. No. 554,395, filed Mar. 3, 1975, now U.S. Pat. No. 3,977,710, issued Aug. 31, 1976, which was a continuation-in-part of my prior application Ser. No. 425,561 filed Dec. 17, 1973, now abandoned.

BACKGROUND OF THE INVENTION

1. Field of the Invention

This invention relates to pipes and tubular conduits and to metal working and more particularly to a mechanical process of flaring an inserted tube end or expanding a part in an aperture or radially expanding an internally fitting tube.

2. Description of the Prior Art

The prior art of metal working has known many types of tube and fitting assemblies wherein a tube and a fitting are sealed through the deformation or swaging of metal.

In many cases, the swaging or deformation process caused a cold welding of the tube and fitting due to extremely high pressures exerted between the tube and fitting. Cold welding was generally accomplished on softer materials such as aluminum and the like. One disadvantage of cold welding was that the weld took place only when the materials were freshly cut or prepared. If aluminum parts were stored for any substantial period of time, then no cold weld would form due to aluminum oxide on the surfaces.

The prior art has joined tube and fitting assemblies by inserting a tube into a fitting and using a flaring tool to expand the tubing wall to engage the fitting. For example, a fitting bore may have a recess wherein the tubing wall was radially expanded by a flaring tool to engage the bore recess to form a seal between the tube and the fitting. This process was suitable only for larger tubes and did not provide a high pressure seal.

The prior art has used a ring stake process to join a small tube to a fitting. The ring stake process incorporated a fitting having a single bore substantially the same diameter as the tube. The tube was inserted into the bore and a die swaged an outside surface of the fitting surrounding the bore to cause a deformation of the fitting to engage the tubing wall. This process did not require any internal flaring tool and provided a seal satisfactory at low-pressure so long as no torsional strain was applied between the tube and the fitting. However, the seal could be destroyed if a torque was applied between the tube and the fitting about the axis of the tube. Consequently, the ring stake tube fitting assembly proved unreliable for many applications.

In my prior application, Ser. No. 425,561 filed Dec. 17, 1973, now abandoned, I disclosed a Method and Apparatus which overcame these disadvantages. However, my prior Method and Apparatus was more adaptable for use with small tubing.

In my continuation-in-part application, now U.S. Pat. No. 3,977,710, issued Aug. 31, 1976, I disclosed a Method and an Apparatus which incorporated an auxiliary sleeve for added torsional and vibrational strength. This invention disclosed in U.S. Pat. No. 3,977,710 resulted in a seal in larger tubing which was superior to the seal formed with my original invention Ser. No. 425,561, now abandoned.

In the instant invention, I disclose a Method and an Apparatus which is more adaptable to a larger variety of tubing sizes and which results in a tube fitting assembly of superior specifications.

Therefore, an object of this invention is to provide a tube fitting assembly method which requires no cold welding nor internal flaring tools.

Another object of this invention is to provide a tube fitting assembly method incorporating a shoulder surface within a fitting orifice for preventing axial separation of the tube from the fitting.

Another object of this invention is to provide a tube fitting assembly method which can be formed from a wide range of tubing sizes and cross-sectional shapes.

Another object of this invention is to provide a tube fitting assembly method which has a high torsional strength.

Another object of this invention is to provide a tube fitting assembly method incorporating thread means for securing at least a portion of a radially expanded bead between adjacent thread surfaces.

Another object of this invention is to provide a tube fitting assembly method incorporating a plural orifice fitting for enabling radial expansion of the tubing wall in conjunction with the ring staking of an outside surface of the fitting.

Another object of this invention is to provide a tube fitting assembly method which is capable of high pressure sealing and which is reliable when subjected to vibration.

Another object of this invention is to provide a tube fitting assembly method which is applicable for use in air conditioning systems, hydraulic systems, and fluid systems for motor vehicles, aircraft and the like.

SUMMARY OF THE INVENTION

The invention may be incorporated in a method of forming an assembly of a tubing and a fitting wherein the tubing has an inside wall surface and the fitting has a first orifice through a portion of the fitting and a second orifice through a portion of the first orifice with the fitting having an outside surface surrounding the second orifice comprising the steps of, holding the fitting, forming shoulder means in one of the first and second orifices having a shoulder surface facing inwardly relative to the outside surface of the fitting, holding the tubing, inserting the tubing end into the first orifice of the fitting, securing the tubing end relative to the fitting to prevent relative movement therebetween, axially contracting the tubing length between the tubing end and the tubing holder by relative movement between the tubing holder and the fitting holder to form a bead from material of the contracted tubing length within the second orifice, and radially expanding the bead through continued contraction of the tubing length to substantially fill the second orifice radially outwardly from the inside wall of the tubing and to engage the shoulder surface to seal the tubing to the fitting.

DESCRIPTION OF THE PREFERRED EMBODIMENTS

Figure 1:
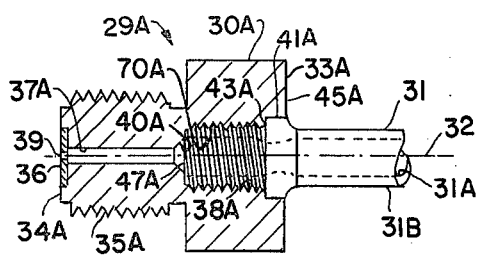
FIG. 1 is a longitudinal sectional view of a first species of a novel tube fitting assembly.
Figure 2:
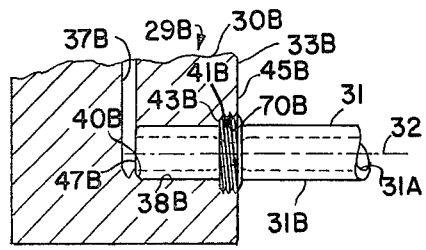
FIG. 2 is a partial longitudinal sectional view of a second species of a novel tube fitting assembly.
Figure 3:
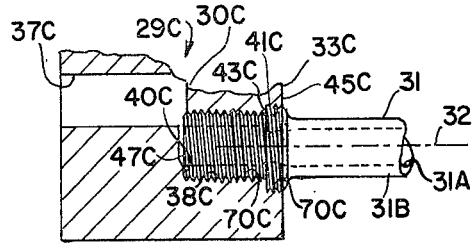
FIG. 3 is a partial longitudinal sectional view of a third species of a novel tube fitting assembly.

FIGS. 1–5 are longitudinal sectional views of five species of a novel tube fitting assembly incorporating the instant invention. The common aspects of each of the five species will be considered simultaneously with the difference therebetween being emphasized hereinafter. The assemblies 29A–29E comprise fittings 30A–30E pressure sealed to tubings 31. The fittings 30A–30E have body portions 33A–33E with axes 32 extending through the body portions. The embodiments shown in FIGS. 1 and 5 include a cylindrical tip 34A and 34E along the axis 32 with mounting threads 35A and 35E for securing the assemblies to a frame structure (not shown). The fittings shown in FIGS. 1, 2, 3 and 5 include apertures 37A, 37B 37C and 37E which are in fluid communication with an internal portion of the fittings. The fittings may be made of a suitable metallic material such as aluminum for use as a pilot burner in a gas operated appliance. The species shown in FIG. 1 includes a tip member 36 having a tip aperture 39 made of a stronger metallic material such as stainless steel pressed into the cylindrical tip 34A to provide additional resistance to heat from the pilot flame. The fitting 30D in FIG. 4 includes a cutout portion for receiving an O-ring 44 for sealing the fitting 30D to another surface (not shown). The seal between the tubing 31 and the fitting 30D is accomplished within the tube fitting assembly 29D.

The body portions 33A–33E include a first surface defining first orifices 38A–38E with inside surfaces 40A, B, C, and E of the fittings 30A, B, C and E being at the end of the first orifices 38A, B, C and E. Second surfaces in the fittings define second orifices 41A–41E which extend through at least a portion of the first orifices 38A–38E and form shoulder means 43A–43E at the junction of the first and second orifices 38A–38E and 41A–41E. The second orifices 41A–41E extend from outside surfaces 45A–45E of the fittings 30A–30E.

The fittings 30A–30E include an axially outwardly facing shoulder means and an axially inwardly facing shoulder means relative to the outside surfaces 45A–45E of the fittings. In FIGS. 1–4 the inwardly and outwardly facing shoulder means are shown as a plurality of shoulders formed by a helical thread through at least a portion of one or both of the first and second orifices 38 and 41. The inwardly and outwardly facing shoulder means may be considered to be at least one inwardly facing helical shoulder and at least one outwardly facing helical shoulder as will be explained hereinafter.

Figure 4:
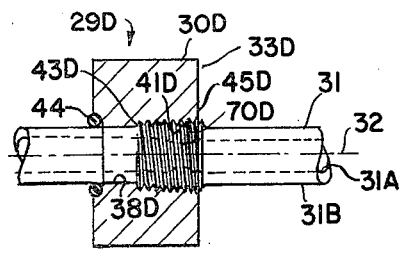
FIG. 4 is a longitudinal sectional view of a fourth species of a novel tube fitting assembly.
Figure 5:
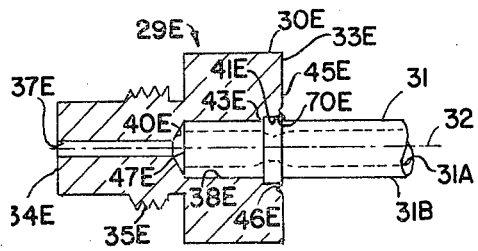
FIG. 5 is a longitudinal sectional view of a fifth species of a novel tube fitting assembly.
Figures 6, 7:
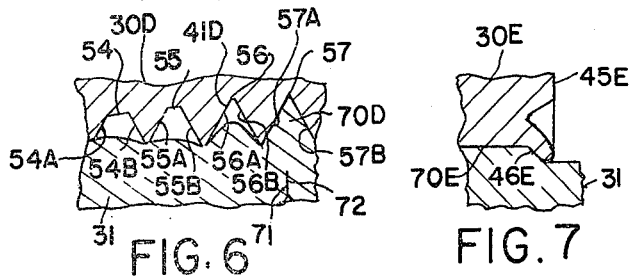
FIG. 6 is an enlarged view of a portion of the novel tube fitting assembly shown in FIG. 4.
FIG. 7 is an enlarged view of a portion of the novel tube fitting assembly shown in FIG. 5.

FIG. 6 is an enlarged view of a portion of the tube fitting assembly shown in FIG. 4. A plurality of threads 54–57 are adjacent threads formed by a single thread tap being applied to orifice 41D. The threads 54 and 55 are imperfectly formed due to the leading cutting edges of a tap. The outwardly facing surfaces comprises surfaces 54A–57A whereas the inwardly facing surfaces comprise 54B–57B. In FIG. 5, the outwardly facing surface includes shoulder 43E whereas the inwardly facing surface 46E is shown as a deformed portion of the fitting 30E adjacent the outside surface 45E. FIG. 7 is an enlarged view showing the inwardly facing shoulder surface 46E in greater detail.

The inwardly and outwardly facing shoulder means define a portion of one of the orifices to have a different cross-sectional area relative to another portion of the same orifice. For example, the threads 54–57 shown in FIG. 6 define portions of different cross-sectional area than other portions within the same orifice. FIGS. 1–5 have at least one orifice having portions thereof with different cross-sectional area than other portions within the same orifice. The shoulder means 43E and 46E in FIG. 5 define areas of different cross-sectional area within the second orifice 41E. One tube fitting assembly constructed by the inventor in accordance with FIG. 4 had an outside tubing diameter of 0.125 inches, and had a first orifice 38D diameter of 0.128 inches. The inside diameter of the second orifice 41D at the crest of the threads was 0.135 inches.

The tubings 31 have an inside tubing wall 31A and an outside tubing wall 31B. The tubings 31 may be selected to be substantially equal in total cross-sectional area or diameter to the first orifices 38A–38E. The tubings 31 are shown with tubing ends 47A, B, C and E contacting the inside surfaces 40A, B, C and E of the fittings 30A, B, C and E. The tubing 31 or orifices 38 and 41 may appear in various cross-sectional shapes such as a polygon, circular or curved structures.

The tubings 31 are sealed to the fittings 30A–30E by the radial extension of the tubing wall about the axes 32 caused by the axial contraction of the tubing length. A peripheral sealing bead means 70 extends around the periphery of the outside surface 31B of the tubing wall and is unitary with the tubing 31. The peripheral sealing bead means substantially fills the first and second orifices 38 and 41 radially outwardly from the inside surface 31B of the tubing 31. The sealing bead means includes first and second portions 71 and 72 of the inside tubing wall to be contracted and folded into engagement with each other. The enlarged view in FIG. 6 illustrates the portions 71 and 72 of the inside wall of the tubing 31. In an actual tube fitting assembly, the crack between the first and second portions 71 and 72 of the tubing wall cannot be detected by the unaided eye. The peripheral sealing bead means includes the radially expanded first and second portions of the outside wall 31B of the tubing to seal against the inwardly and outwardly facing shoulder surfaces. For example, in FIG. 6; the radially expanded sealing bead means 70D contacts the outwardly facing surface 57A and the inwardly facing surface 57B. The sealing bead means 70D is locked between the inwardly and outwardly facing shoulder means to prevent axial separation of the tubing 31 from the fitting 30. Generally, complete seals are formed between a plurality of adjacent inwardly and outwardly facing shoulder surfaces. The seal formed by this structure may be considered to be a plurality of seals between adjacent threads of a helical thread or may be considered to be a helical seal along the path of the thread.

The embodiment shown in FIGS. 5 and 7 represents an annular sealing bead means whereas the embodiments shown in FIGS. 1-4 are helical sealing bead means. The peripheral sealing bead means 70E in FIG. 7 is annular in shape and is locked between the inwardly facing shoulder means 46E and the outwardly facing shoulder means 43E.

In my prior patent applications Ser. No. 425,561 filed Dec. 17, 1973; Ser. No. 527,683 filed Nov. 27, 1974; and Ser. No. 554,971 filed Mar. 3, 1975, the latter of which has issued into U.S. Pat. No. 3,930,298; I disclosed a tube fitting assembly and Method of making thereof which was readily adaptable to small diameter tubing, for example; 0.125 inches (3.2mm) outside diameter (O.D.). In my continuation-in-part application, now U.S. Pat. No. 3,977,710, issued Aug. 31, 1976, I disclosed an invention which was more suitable for larger diameter tubing for example, ⅜ inches (O.D.) or 9.5 millimeters (O.D.). With the invention described in U.S. Pat. No. 3,977,710, tube fitting assemblies were produced that sealed under pressure tests of 1,000 pounds per square inch (p.s.i.) at a temperature of 650° F. The present invention discloses a tube fitting assembly and method of making thereof which is more adaptable for a wider variety and size of tubing than heretofore possible in either of my prior inventions. These tube fitting assemblies exhibit extraordinary strength and resistance to vibration as consistent with my inventions of the past.

The present invention incorporates the rotational strength of my prior inventions U.S. Pat. No. 3,930,298, issued Jan. 6, 1976 and U.S. Pat. No. 3,977,710, issued Aug. 31, 1976, filed Mar. 3, 1975 which are incorporated by reference herein. The instant invention provides a superior axial strength to prevent the tubing 31 from separating from the fitting 30 along axis 32.

The invention has been set forth in the preferred form as a tube fitting assembly 29 comprising the fitting 30 having an outside surface 45 and a first orifice 38. The first orifice 38 extends through at least a portion of the fitting 30. The fitting 30 has a second orifice 41 which extends from the outside surface 45 of the fitting 30 through at least a portion of the first orifice 38. The first and second orifices 38 and 41 may be tapered and may exhibit various cross-sectional shapes. One of the first and second orifices 38 and 41 has shoulder means defining areas of greater cross-sectional area in the orifice than another portion of the orifice.

The tubing has an inside surface 31A and an outside surface 31B and is disposed within the first and second orifices 38 and 41. A peripheral sealing bead means 70 extends around the periphery of the outside tubing wall 31B with a first and a second portion 71 and 72 in FIG. 6 of the inside tubing wall axially contacting one another. Radially expanded first and second portions of the outside wall 31A of the tubing 31 establish a sealing engagement with the first and second shoulder surfaces 57A and 57B as shown in FIG. 6.

Figure 8:
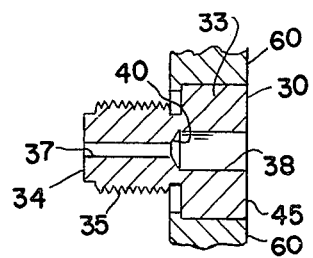
FIG. 8 illustrates the first step in the method of forming a tube fitting assembly wherein the fitting is held in a fitting holder.
Figure 9:
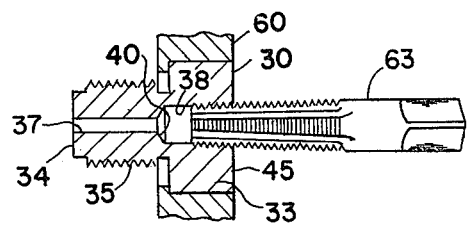
FIG. 9 illustrates the second step in the method of forming a tube fitting assembly wherein shoulder means is formed on an internal orifice of the fitting.
Figure 10:
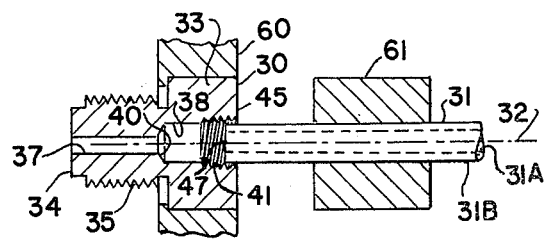
FIG. 10 illustrates a third step in the method of forming a tube fitting assembly wherein a tube is inserted into the fitting.

The invention embodied in the tube fitting assemblies shown in FIGS. 1-7 also resides in the method of making the tube fitting assembly which is shown in FIGS. 8-12. FIG. 8 shows the first step in the method of forming a tube fitting assembly; namely holding the fitting 30 with holding dies 60. The fitting 30 in FIG. 8 has only a first orifice 38 and the second orifice 41 has yet to be formed. The second step of the process includes forming shoulder means in one of the first and second orifices having an inwardly facing shoulder surface and an outwardly facing shoulder surface relative to the outside surface 45 of the fitting 30. FIG. 9 illustrates the step of forming the shoulder means by tapping the fitting 30 held in the fitting holder 60. A tap 63 which forms the shoulder means also forms the second orifice 41. However, the second orifice 41 can be preformed, as would be the case with the bodies of FIGS. 2 and 3. FIG. 10 illustrates the steps of holding the tubing 31 with tubing holder dies 61 and inserting the tubing end 47 into the first orifice 38 of the fitting 30. The axial relative movement between the fitting holding dies 60 and the tubing holding dies 61 results in the tubing end engaging the inside surface of the fitting at the termination of the first orifice 38. The process includes securing to the tubing end 47 relative to the fitting 30 to prevent relative movement therebetween. This securing may be accomplished by inserting the tubing end 47 to abut the inside surface 40 of the fitting 30 to prevent relative movement between the tubing end 47 and the inside surface 40. The securing of the tubing end may be done by other means such as a die or mechanical stop for forming the fitting shown in FIG. 4.

Figure 11:
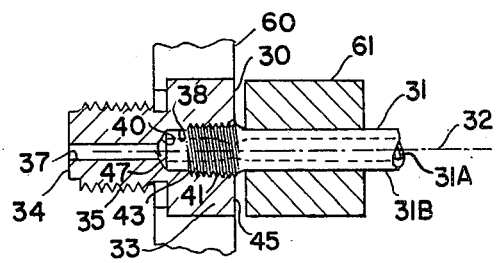
FIG. 11 illustrates a fourth step in the method of forming a tube fitting assembly wherein the tubing wall is radially expanded to seal the tube to the fitting.

FIG. 11 illustrates the axial contraction of the tubing length between the tubing end 47 and the tubing holding die 61 by relative movement between the tubing holding die 61 and the fitting holding die 60. The axial contraction of the tubing length causes radial expansion of the tubing wall to form a bead of the material of the contracted tubing length within the orifices. The radial expansion of the bead through continued contraction of the tubing length substantially fills the second orifice radially outwardly from the inside wall of the tubing to engage the shoulder surface. The force applied between the fitting holder 60 and the tubing holder 61 is in excess of 1,000 pounds. Applied to a tubing having an 0.125 inch O.D. and a 0.035 inch wall thickness results in a pressure in excess of 100,000 pounds per square inch.

During the axial contraction of the tubing wall, the inside wall surface 31A of the tubing 31 bulges inwardly. It is believed that this inward bulge aids the outward radial expansion of the tubing wall.

Figure 12:
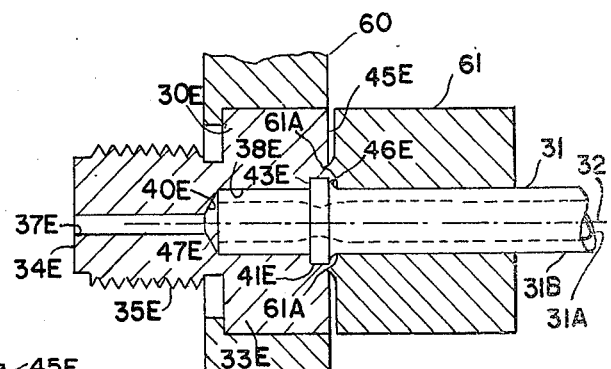
FIG. 12 is an alternate step in the method of forming the tube fitting assembly shown in FIG. 5.

FIG. 12 illustrates an alternate method of forming the inwardly facing shoulder surface 46E which includes striking the outside surface 45E of the fitting 30E about the second orifice 41E. The deformation of the fitting 30E produces the shoulder surface 46E within the second orifice 41E. The step of striking the surface may be accomplished by an annular projection 61A on the front surface of the tubing holding die 61. The step of striking may be consummated at the sequence shown at FIG. 9 or may be consummated at the sequence shown at FIG. 12 after partial or total radial expansion of the bead. The advancement of this invention over the prior art can best be appreciated in view of the pressure tightness and mechanical strength of the tube fitting assembly. Much of the strength is attributed under present understanding, to the first and second orifices of different cross-sectional areas in addition to the inwardly and outwardly facing shoulder means which prevent axial separation of the fitting and the tubing.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and method of assembly may be resorted to without departimg from the spirit and the scope of the invention as hereinafter claimed.

What is claimed is:

1. A method of forming an assembly of a tubing and a fitting wherein the tubing has an inside wall surface and the fitting has a first orifice through a portion of the fitting and a second orifice through a portion of the first orifice with the fitting having an outside surface surrounding the second orifice comprising, the steps of:
   holding the fitting;
   forming helical thread means in one of the first and second orifices having a helical shoulder surface facing inwardly relative to the outside surface of the fitting;
   holding the tubing;
   inserting the tubing end substantially only axially into the first orifice of the fitting;
   securing the tubing end relative to the fitting to prevent relative axial movement therebetween;
   axially contracting the tubing length between the tubing end and the tubing holder by relative axial movement between the tubing holder and the fitting holder to form a bead from material of the contracted tubing length within the second orifice;
   and radially expanding the bead through continued contraction of the tubing length to substantially fill the second orifice radially outwardly from the inside wall of the tubing and to engage the helical shoulder surface to seal the tubing to the fitting.

2. A method as set forth in claim 1, wherein the step of forming the fitting includes forming a plurality of shoulder surfaces along at least a portion of the axial length of said one of the first and second orifices.

3. A method as set forth in claim 1, wherein the step of securing the tubing end relative to the fitting includes abutting the tubing end against an inside surface of the fitting defined at an end of one of the first and second orifices.

4. A method as set forth in claim 3, wherein the step of radially expanding the bead includes radially expanding the bead into a helical seal with the inwardly facing helical shoulder surface.

5. A method of forming an assembly of a tubing and a fitting wherein the fitting has orifice means through at least a portion of the fitting with the fitting having an outside surface surrounding the orifice means comprising, the steps of:
   holding the fitting;
   threading at least a portion of the axial length of the orifice means forming a helical shoulder surface facing inwardly relative to the outside surface of the fitting and forming a helical shoulder surface facing outwardly relative to the outside surface of the fitting;
   holding the tubing;
   inserting an end of the tubing substantially only axially into the orifice means of the fitting;
   securing the tubing end relative to the fitting to prevent relative axial movement therebetween;
   axially contracting the tubing length between the tubing end and tubing holder by relative axial movement between the tubing holder and the fitting holder and forming a bead from material of the contracted tubing length within the orifice means;
   and radially expanding the bead through continued contraction of the tubing length to engage the expanded bead with the helical shoulder surface facing inwardly and to engage the expanded bead with the helical shoulder surface facing outwardly to secure at least portions of the expanded bead between the inwardly and outwardly facing shoulder surfaces to prevent axial movement of the tubing relative to the fitting.

6. A method as set forth in claim 5, wherein the step of inserting the tubing into the orifice means includes sliding the tubing into the threaded orifice means.

7. A method of forming an assembly of a tubing and a fitting wherein the tubing has an inside wall surface and the fitting has a first orifice through a portion of the fitting and a second orifice through a portion of the first orifice with the fitting having an outside surface surrounding the second orifice and shoulder means in one of the first and second orifices having a helical shoulder surface facing inwardly relative to the outside surface of the fitting, comprising, the steps of:
   holding the tubing in a tubing holder;
   holding the fitting in a fitting holder;
   inserting an end of the tubing substantially only axially into the first orifice of the fitting;
   securing the tubing end relative to the fitting to prevent relative axial movement therebetween;
   axially contracting the tubing length between the tubing end and tubing holder by relative axial movement between the tubing holder and the fitting holder to form a bead from material of the contracted tubing length within the second orifice;
   and radially expanding the bead through continued contraction of the tubing length to substantially fill the second orifice radially outwardly from the inside wall of the tubing and to engage the helical shoulder surface to seal the tubing to the fitting.

8. The method of assembling a tube and a fitting into a tube-fitting assembly,
   the fitting having an outside surface with an orifice larger than the normal cross-sectional area of the tube and with a transverse stop in the orifice,
   the method comprising the steps of, internally threading the orifice, grasping the tube with the tube jaws,
   holding the fitting,
   relatively only axially moving toward each other the tube and the fitting to slidingly insert the end of the tube into the threaded orifice and abutting the transverse stop,
   and continuing the relative axial forward movement to axially compress the tube to form a radially expanded bead within the orifice sealed against said internal thread in the orifice to prevent axial separation of the tube from the fitting in the completed tube-fitting assembly.

* * * * *